(12) United States Patent
Dankbaar et al.

(10) Patent No.: US 9,970,564 B2
(45) Date of Patent: May 15, 2018

(54) SMA VALVE FOR CONTROLLING PRESSURIZED AIR SUPPLY TO AN AIR CELL IN A VEHICLE SEAT

(71) Applicant: Kongsberg Automotive AB, Mullsjö (SE)

(72) Inventors: Frank Dankbaar, Mullsjö (SE); Anders Grönhage, Mullsjö (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 0 days. days.

(21) Appl. No.: 15/314,252

(22) PCT Filed: Jun. 4, 2014

(86) PCT No.: PCT/EP2014/061614
§ 371 (c)(1),
(2) Date: Nov. 28, 2016

(87) PCT Pub. No.: WO2015/185132
PCT Pub. Date: Dec. 10, 2015

(65) Prior Publication Data
US 2017/0159839 A1  Jun. 8, 2017

(51) Int. Cl.
*F16K 31/00* (2006.01)
*B60N 2/44* (2006.01)
*F16K 3/316* (2006.01)

(52) U.S. Cl.
CPC ............ *F16K 31/002* (2013.01); *B60N 2/448* (2013.01); *B60N 2/4415* (2013.01); *F16K 3/316* (2013.01)

(58) Field of Classification Search
CPC ..... F16K 31/002; F16K 3/316; B60N 2/4415; B60N 2/448

(Continued)

(56) References Cited

U.S. PATENT DOCUMENTS 2,299,404 A   10/1942   Newton
3,480,040 A   11/1969   Erickson
(Continued)

FOREIGN PATENT DOCUMENTS

CN   101725733 A   6/2010
DE   102 57 549 B3   8/2004
(Continued)

OTHER PUBLICATIONS

English language abstract and machine-assisted translation of Japanese Publication No. JP H07 71628 A extracted from www.espacenet.com on Aug. 15, 2017; 7 pages.

(Continued)

*Primary Examiner* — Umashankar Venkatesan
(74) *Attorney, Agent, or Firm* — Howard & Howard Attorneys PLLC (57) ABSTRACT

SMA valve for controlling pressurized air supply to an air cell in a vehicle seat comprising: a valve housing; a valve element (4) moveable between a closed position in which it is in sealing abutment with a valve seat, and an open position; a spring element urging the valve element to the closed position; a SMA wire (1) extending between a fixed point and the valve element (4), and which is arranged such that shortening of the SMA wire upon exceeding its threshold temperature exerts a force on the valve element (4) pulling it from the closed to the open position; a conductor (20) arranged to close an electrical circuit when the valve element reaches its open position; a control unit for supplying electrical power to the SMA wire for opening the valve and to detect closure of the electrical circuit, and arranged to reduce the electrical power supply to the SMA wire when detecting closure of the electrical circuit, wherein the suspension (8, 10, 10', 12, 12', 14, 14') of the valve element is arranged such that the valve element moves parallel to the (Continued)

mounting plate (30) between the closed and open positions; and an actuator arm (16) fixed to and extending from the suspension is arranged such that it, upon movement of the valve element to the open position, pivots towards the mounting plate bringing the conductor (20) into contact with a contact area (34) on the mounting plate.

16 Claims, 5 Drawing Sheets

(58) Field of Classification Search
USPC .............................................. 251/11, 129.06
See application file for complete search history.

(56) References Cited

U.S. PATENT DOCUMENTS

| | | |
|---|---|---|
| 4,429,552 A | 2/1984 | Reedy |
| 4,570,851 A | 2/1986 | Cirillo |
| 4,655,505 A | 4/1987 | Kashiwamura et al. |
| 4,840,425 A | 6/1989 | Noble |
| 4,973,024 A | 11/1990 | Homma |
| 5,127,708 A | 7/1992 | Kishi et al. |
| 5,135,282 A | 8/1992 | Pappers |
| 5,345,963 A | 9/1994 | Dietiker |
| 5,622,482 A | 4/1997 | Lee |
| 5,669,416 A | 9/1997 | Nusche |
| 5,787,947 A | 8/1998 | Hertsgaard |
| 6,024,545 A | 2/2000 | Morioka |
| 6,116,569 A | 9/2000 | Cox |
| 6,123,320 A | 9/2000 | Rasanow et al. |
| 6,220,667 B1 | 4/2001 | Wagner |
| 6,247,678 B1 | 6/2001 | Hines et al. |
| 6,276,385 B1 | 8/2001 | Gassman |
| 6,449,434 B1 | 9/2002 | Fuss |
| 6,464,200 B1 | 10/2002 | Hines et al. |
| 6,494,225 B1 | 12/2002 | Olewicz et al. |
| 6,564,824 B2 | 5/2003 | Lowery et al. |
| 6,918,884 B2 | 7/2005 | Knelsen et al. |
| 6,972,659 B2 | 12/2005 | Von Behrens et al. |
| 7,093,817 B2 | 8/2006 | MacGregor et al. |
| 7,331,563 B2 | 2/2008 | Biehl et al. |
| 7,363,942 B2 | 4/2008 | Fernandez |
| 7,484,528 B2 | 2/2009 | Beyerlein et al. |
| 7,663,811 B2 | 2/2010 | Noda et al. |
| 7,748,405 B2 | 7/2010 | Ghorbal et al. |
| 7,911,332 B2 | 3/2011 | Caretta et al. |
| 8,127,543 B2 | 3/2012 | Von Behrens et al. |
| 8,382,460 B2 | 2/2013 | Ramunas et al. |
| 8,570,384 B2 | 10/2013 | Brown et al. |
| 8,714,199 B2 | 5/2014 | Deperraz et al. |
| 9,027,903 B2 | 5/2015 | Arekar et al. |
| 9,462,928 B2 | 10/2016 | Marone et al. |
| 9,630,560 B2 | 4/2017 | Alacqua et al. |
| 2001/0011414 A1 | 8/2001 | Hines et al. |
| 2005/0121636 A1 | 6/2005 | Scott |
| 2007/0023089 A1 | 2/2007 | Beyerlein et al. |
| 2007/0166170 A1 | 7/2007 | Nason et al. |
| 2007/0246285 A1 | 10/2007 | Browne et al. |
| 2008/0018198 A1 | 1/2008 | Sohn et al. |
| 2008/0251746 A1 | 10/2008 | Riley et al. |
| 2008/0254346 A1 | 10/2008 | Burstall et al. |
| 2008/0271559 A1 | 11/2008 | Garscha |
| 2010/0111733 A1 | 5/2010 | Ramunas et al. |
| 2010/0222733 A1 | 9/2010 | Scheiber et al. |
| 2011/0039967 A1 | 2/2011 | Wilson et al. |
| 2011/0166524 A1 | 7/2011 | Preuthun et al. |
| 2012/0011843 A1 | 1/2012 | Makinson et al. |
| 2012/0025113 A1 | 2/2012 | Stadelbauer et al. |
| 2012/0067430 A1 | 3/2012 | Deperraz et al. |
| 2012/0153043 A1 | 6/2012 | Arekar et al. |
| 2012/0160334 A1 | 6/2012 | Deperraz et al. |
| 2012/0199768 A1 | 8/2012 | Love et al. |
| 2012/0223554 A1 | 9/2012 | Lem et al. |
| 2013/0002933 A1 | 1/2013 | Topliss |
| 2013/0162896 A1 | 6/2013 | Kang et al. |
| 2013/0277580 A1 | 10/2013 | Deperraz |
| 2014/0060858 A1 | 3/2014 | Johnson |
| 2014/0125042 A1 | 5/2014 | Köpfer |
| 2015/0202993 A1 | 7/2015 | Mankame et al. |
| 2016/0018016 A1 | 1/2016 | Dankbaar et al. |

FOREIGN PATENT DOCUMENTS

| | | |
|---|---|---|
| DE | 10 2005 060 217 A1 | 7/2006 |
| DE | 10 2008 021 444 A1 | 11/2009 |
| EP | 2 078 891 A2 | 7/2009 |
| EP | 2 239 486 A1 | 10/2010 |
| EP | 2 312 187 A1 | 11/2012 |
| JP | S 62-167981 U | 10/1987 |
| JP | H07 71628 A | 3/1995 |
| JP | 2006-037786 A | 2/2006 |
| WO | WO 01/33306 A2 | 5/2001 |
| WO | WO 2007/030417 A2 | 3/2007 |
| WO | WO 2015/086088 A1 | 6/2015 |
| WO | WO 2015/086089 A1 | 6/2015 |
| WO | WO 2015/086094 A1 | 6/2015 |

OTHER PUBLICATIONS

English language abstract and machine-assisted English language translation of Japanese Publication No. JP 2006-037786 A extracted from www.espacenet.com on Aug. 15, 2017; 8 pages.
English language abstract and machine-assisted translation of Chinese Publication No. CN 101725733 A extracted from www.espacenet.com on Aug. 15, 2017; 5 pages.
English language abstract and machine-assisted English language translation of European Patent No. EP 2 312 187 A1 extracted from www.espacenet.com on Dec. 21, 2015; 11 pages.
International Search Report for International Patent Application No. PCT/IB2013/000307 dated Nov. 11, 2013; 4 pages.
Shkolnikov, Viktor, Ramunas, John, and Santiago, Juan G., "A Self-priming, roller-free, miniature, peristaltic pump operable with a single, reciprocating actuator", Sens Actuators A Phys. May 2010 ; 160(1-2): 141-146, doi:10.1016/j.sna.2010.04.018, © 2010 Elsevier B.V.; 16 pages.
Website: http://www.takasago-fluidics.com/products_valve/others/SMV/, Shape Memory Alloy Valve SMV Series, Jul. 9, 2014; 2 pages.
International Search Report for Application No. PCT/EP2013/076494 dated Sep. 16, 2014, 2 pages.
International Search Report for Application No. PCT/EP2013/076507 dated Sep. 16, 2014, 4 pages.
International Search Report for Application No. PCT/EP2013/076593 dated Oct. 2, 2014, 3 pages.
International Search Report for Application No. PCT/EP2014/061614 dated Jan. 30, 2015, 4 pages.
English language abstract and computer-generated English translation for DE 102 57 549 B3 extracted from espacenet.com database on Nov. 15, 2016, 15 pages.
English language abstract and computer-generated English translation for DE 10 2005 060 217 A1 extracted from espacenet.com database on Nov. 15, 2016, 12 pages.
English language abstract and computer-generated English translation for DE 10 2008 021 444 A1 extracted from espacenet.com database on Nov. 15, 2016, 11 pages.
Computer-generated English language translation for JPs 62-167981 U extracted from PAJ database on Nov. 15, 2016, 3 pages.
English Language Translation for JPS 62-167981 provided by Morningside IP dated Oct. 26, 2017 and certified by Morningside IP dated Dec. 11, 2017. Partial computer-generated English language translation of JPS 62-167981 was previously cited in a first Information Disclosure Statement dated Nov. 28, 2016.

SMA VALVE FOR CONTROLLING PRESSURIZED AIR SUPPLY TO AN AIR CELL IN A VEHICLE SEAT

The subject application is the National Stage of International Patent Application No. PCT/EP2014/061614, filed on Jun. 4, 2014, the disclosure of which is incorporated herein by reference in its entirety.

The present invention relates to a SMA valve for controlling pressurized air supply to an air cell in a vehicle seat comprising: a valve housing; a valve element which is moveably suspended with respect to a mounting plate in the housing to be moveable between a closed position in which it is in sealing abutment with a valve seat establishing a closed state of the valve, and an open position in which the valve element is moved away from the valve seat corresponding to an open state of the valve; a spring element adapted to exert a bias force on the valve element urging it to the closed position; a SMA wire which is extending between a point fixed in the housing and the valve element, and which is arranged such that shortening of the SMA wire upon exceeding its threshold temperature exerts a force on the valve element which pulls the valve element away from the closed position against the bias force of the spring element; a conductor arranged with respect to the mounting plate such that it is moved into contact with a contact area on the mounting plate to close an electrical circuit as a result of the valve element reaching its open position, and such that it is moved away from the contact area again when the valve element leaves the open position; and a control unit arranged to supply electrical power to the SMA wire for opening the valve and to detect closure of the electrical circuit, and arranged to reduce the electrical power supply to the SMA wire when detecting closure of the electrical circuit.

Drivers and passengers of motor vehicles, especially when driving long distances, often experience discomforts caused by long time static posture when seated in the vehicle seat. This is not only felt as being uncomfortable and causing for example back pain but may also lead to permanent impairment of health, in particular for professional drivers such as taxi, truck and bus drivers. To provide a remedy the automotive industries since some time offers vehicle seats with adjustable lumbar supports and bolsters and with integrated massage systems in the back seat which are based on pneumatic actuation. The lumbar supports and bolsters in seats are adjusted by inflating air cells by supplying pressurized air to the air cells. Pressurized air supply is terminated and the air cells are closed once the lumbar support and bolsters reached their desired inflation state. In massage systems series of air cells in the seat back are sequentially inflated and deflated to provide a massage effect.

In a massage system for a vehicle seat there is a controllable valve upstream of each air cell to permit to control the inflation/deflation of each cell individually, and further valves for controlling venting. Since the number of air cells in a massage system is considerable, the number of valves is correspondingly large. Similarly, in vehicle seats having adjustable lumbar supports and bolsters valves are present to open the air cells for inflation and to close the cells at the desired inflated state.

Solenoid valves are technically well suited to be utilized as controllable valves in massage system and in lumbar support and bolster systems for vehicle seats, but such valves are relatively expensive, physically large and heavy and therefore not preferred for applications such as in vehicle seats where valves are employed in large numbers for example in massage systems.

Another type of controllable valve is the so called SMA valve, wherein SMA stands for "shape memory alloy". A SMA valve comprises a housing, a plunger as valve element, a spring urging the plunger to a closed position in a valve seat, and an actuator capable of acting on the plunger such that the actuator upon activation exerts a force on the plunger which moves the plunger away from the valve seat to an open position and keeps it there as long as the activator remains activated. In this case the actuator comprises a metal wire made of a shape memory alloy. Such shape memory alloy changes its microscopic structure at a threshold temperature such that a SMA wire shortens upon exceeding the threshold temperature. In particular, a SMA material at room temperature is in the state of a metal with martensitic properties, whereas the structure transitions at a threshold temperature of about 80° C. into an austenitic structure. Due to this transition a SMA wire shortens, wherein the shortening provides the force acting on the plunger to move it into the opened position. Actuation of the SMA valve is controlled by selectively supplying an electrical current to the SMA wire to heat it up to the threshold temperature and to keep it at such temperature for the desired activation cycle, whereafter electrical power supply to the SMA wire is terminated to let the SMA wire cool down below the threshold temperature.

SMA valves have some advantages for applications such as in massage systems and lumbar supports and bolsters in vehicle seats since they can be designed to have low weight, the valve are almost completely quite in operation and may be provided at relatively low costs.

A SMA valve is for example described in DE 10 2005 060 217 A1. This valve has a housing in which a plunger as a valve element is moveably suspended, wherein the plunger is axially guided in a mounting plate and extends further through openings in a shield wall with its longitudinal and moving direction perpendicular to the mounting plate. A SMA wire is fixed with its two opposite ends to the mounting plate at spaced apart points, and is in its central portion fixed to the plunger at a level elevated over the mounting plate such that the SMA wire has the shape of an isosceles triangle wherein the SMA wire portions extending from the central portion in opposite directions form the legs of equal length, and the mounting plate forms the opposite side of the triangle. When the SMA wire is heated up by supply of electrical power to exceed the threshold temperature, the SMA wire shortens which results in shortening of the two legs of the triangle which in turn moves the apex where the SMA wire is connected to the plunger closer to the mounting plate, whereby the plunger is moved towards the mounting plate to the open state of the valve. The diameter of the SMA wire is usually very small, typically less than 0.1 mm. For this reason care has to be taken that the wire is not overheated and destroyed by melting. In a first phase of electrical power supply, the supply level is relatively high to quickly reach the threshold temperature, whereafter the level of electrical power supply is reduced to avoid a overheating of the wire. For this purpose there is an end switch which is actuated by the plunger when the plunger reaches the open position, and the control unit is arranged to reduce the electrical power supply after actuation of the end switch. The end switch is located below the mounting plate so that the lower end of the plunger actuates the end switch when the plunger reaches the open position. The extension of the SMA wire forming an isosceles triangle together with the mounting plate leads to relatively large lateral dimensions of the valve because the angle between the legs is in the embodiment shown rather large and preferably 145° C. so that the distance between the opposite end points of the wire where it is fixed to mounting plate is relatively large.

The above-described SMA valve design is furthermore space consuming in the direction perpendicular to the mounting plate because the plunger extends with its longitudinal axis perpendicular to the mounting plate and moves in this direction.

The preamble of claim 1 is based on a SMA valve as described above with referenced to DE 10 2005 060 217 A1 except for a different end switch. In this case the plunger is a plastic member with a gold plated surface which forms a conductor along the plunger. The SMA wire is in contact with a top surface of the plunger, and when the plunger reaches its open end position a lower end surface of the gold plated plunger comes into contact with a conducting surface on the mounting plate to close an electrical circuit. This closure of the circuit is detected by the control unit which in response lowers the electrical power supply to the SMA wire.

It is an object of the present invention to provide a compact SMA valve with a reliable end switch function.

This object is achieved by a SMA valve comprising the features of claim 1. Preferred embodiments of the invention are set out in the dependent claims.

According to the invention the valve element is suspended such that it moves parallel to the mounting plate between the closed and open positions. In order to provide a safe end switch function in such configuration an actuator arm is fixed to and extends from the suspension and is arranged such that it, upon movement of the valve element from the closed to the open position, pivots downwardly towards the mounting plate to bring at least a portion of the conductor down into contact with the contact area on the mounting plate so that an electrical circuit is closed when the valve element reaches the open position. Since the actuator arm is fixed to the suspension it follows its movements back when the valve element leaves the open position to return to the closed position and pivots upwardly away from the mounting plate so the conductor comes out of contact with the contact area.

In this manner a very compact design can be achieved since the valve element does not extend with its longitudinal direction perpendicular to the mounting plate, but is disposed with its longitudinal axis and its moving direction parallel to the mounting plate so that space vertically above the mounting plate can be saved. In addition the arrangement of the actuating arm to pivot downwardly to bring the conductor down on the contact area to close a circuit is advantageous in such configuration in which the valve element moves parallel to the mounting plate because its functioning depends less critical on dimensions and tolerances of the involved components. The straightforward approach would be to utilize a conductor that is moved with the valve element, i.e. also parallel to the mounting plate, and against an upstanding conducting surface. However, such arrangement would be critically dependent on dimensions and tolerances of the components involved; for example, if the conductor which is moved backward with the valve element is a little bit too short, or has been displaced or bent with respect to the valve element, it cannot reach the upstanding contact surface any more. Similarly, if the upstanding contact surface has not been precisely positioned with respect to the backwardly moving conductor, or has been displaced, the conductor may not reach the conducting surface in which case the end switch function is defect. In this respect a transmission of the backward movement of the vale element into a downwardly pivoting motion to bring down a conductor from above into contact with the contact area is much less sensitive to dimensions and tolerances and is thus more reliable.

In a preferred embodiment the conductor comprises a first conductor portion in conductive contact with the mounting plate, and an elastic cantilever arm of conductive material extending from the first conductor portion. The elastic cantilever arm is protruding with its free end to a position above the contact area on the mounting plate. In an unloaded or rest state the free end of the elastic cantilever arm is located a certain distance above the contact area such that it is ensured that there is no contact between the conductor and the contact area. In order to bring the elastic cantilever arm into contact with the contact area upon the valve element reaching its open position, the actuator arm is provided. The actuator arm is arranged such it is, upon movement of the valve element from the closed to the open position, pivoted downwardly by the movement of the suspension to contact the elastic cantilever arm and to press its free and down into contact with the contact area on the mounting plate. This involves a certain bending of the cantilever arm. When the valve element returns from the open to the closed position, the movement of the suspension causes an accompanying movement of the actuator arm so that it is moved away from the cantilever arm; due to its elastic properties the cantilever arm then returns to its rest position in which its free end is lifted off the contact area.

According to a preferred embodiment the valve element is suspended above the mounting plate by a parallelogram suspension having two parallel connecting links connecting the valve element to a mounting body which in turn is connected to the mounting plate. The connecting links are located at a distance from each other in moving direction of the valve element. The first connecting link is connected to the mounting body by a first hinge and to the valve element by a first valve element hinge; the second connecting link is connected to the mounting body by a second hinge and to the valve element by a second valve element hinge. The connecting links are arranged such that they pivot over an angular range with respect to the longitudinal direction of the valve element and its moving direction when the valve element moves between its closed and open positions, wherein said angular range includes a 90° angle between the connecting links and said longitudinal and moving direction of the valve element. In other words the movement of the valve element from the closed to the open position and vice versa corresponds to a pivotal movement of the connecting links over an angular range around 90°. If this angular range around 90° is sufficiently small this arrangement ensures that the movement of the valve element between the closed and open position and vice versa is to a good approximation a rectilinear movement.

The movement of the valve element is rectilinear in good approximation since the connecting links (if longitudinal and movement direction of the valve element are vertical) moves over an angular range around its horizontal orientation in which it is perpendicular to the direction of movement and to the longitudinal axis of the valve element such that the movement of the valve element is to a good approximation a rectilinear vertical movement. For example, the connecting links may have a length of 9 mm, the distance of travel of the valve element from the closed to the open position may be 1 mm. If the connecting links are perpendicular to the valve element in the closed position thereof, they pivot over a range of about 6° during the movement of the valve element 1 mm backwards to the open position. The deviation of the movement of the valve element from a rectilinear movement in this example is less than 0.05 mm (displacement perpendicular to the longitudinal direction and main moving direction component of the valve element) which is small compared to the travel distance of 1 mm and may be neglected to a good approximation. This main moving direction is referred to as the moving direction of the valve element herein.

A further advantage of the parallelogram suspension is that no guiding or bearing surfaces in sliding contact are needed for suspension of the valve element so that there is no frictional resistance against the movement of the valve element.

In a preferred embodiment the parallelogram suspension and the valve element are integrally formed in one piece, i.e. the mounting body, the first connecting link, the second connecting link, the valve element and the hinges are integrally formed of plastic material. In this case the first and second hinges as well as the first and second valve element hinges are solid state hinges or flexure hinges, each having a zone of weakened material thickness. Such integrated component can be formed in a very cost efficient manner, for example by injection moulding. Furthermore, the production costs are low because no steps for assembling of components of the suspension are necessary since the entire component is formed as a single piece. Such integrated component may be produced with very low tolerances and will not exhibit any play between internal components.

According to a preferred embodiment the SMA wire extends from a first fixation means stationary with respect to the mounting body and located behind the arrangement of valve element and its suspension, so that the valve element during its movement from the closed to the open position comes closer to the fixation means. From the first fixation means the SMA wire extends towards said arrangement, past said arrangement along a first side thereof, around a front face portion of the first connecting link, and in a symmetrical manner back along the opposite side of said arrangement and further to a second fixation means behind said arrangement. Both fixation means can be fixed on an extension portion extending rearwardly from the mounting body and may comprise crimp connectors by which the wires are fixed in contact with conductors leading to the mounting plate.

In a preferred embodiment the front face portion of the first connecting link around which the SMA wire is routed is located at a lower end portion of the first connecting link close to the first hinge. This has the advantage that there is a large transmission ratio between the SMA wire shortening distance and the valve element moving distance from the closed to the open position. Such large transmission ratio is advantageous since the absolute shortening distance provided by a SMA wire with a length that can be accommodated in a compact SMA valve housing is relatively short in absolute terms when comparing it to a movement distance which is desired to bring the valve element from a closed to a fully opened position for typical valve dimensions. A transmission ratio in the range 2-4 is preferred and can easily achieved by placing the point where the SMA wire engages the first connecting link at the lower end portion of the first connecting link close to the first hinge so that the entire remaining portion of the first connecting link serves as a lever transmitting the shortening movement of the SMA wire to the valve element.

In a preferred embodiment the SMA wire extends rectilinearly towards and along said arrangement in a direction essentially parallel to the movement direction of the valve element from the closed to the open position. Since the connecting links are essentially oriented perpendicular to this movement direction this arrangement of the SMA wire provides for a maximal torque on the connecting link.

In a preferred embodiment the actuation arm is formed as a member protruding from the second connecting link in a direction away from the valve element and towards a rearward extension of the mounting body and towards the conductor such that it is pivoted with the second connecting link upon movement of the valve element from the closed to the open position to be pivoted further downwardly so that its outer end comes into contact with the elastic cantilever arm of the conductor to press it down into contact with the contact area on the mounting plate. Preferably, the actuation arm is integrally formed with the second connecting link.

The invention will in the following they described in connection with a preferred embodiment shown in the drawings in which.

The SMA valve comprises a housing (not shown) in which a pressure chamber is located. The housing comprises a valve port (not shown) which is supplied with pressurized air. The valve element 4 is, when it is in the closed position, in sealing contact with its sealing tip portion 6 in abutment on the valve seat formed on the inner end of a valve input so that the valve is closed and no pressurized air is entering the pressure chamber. The pressure chamber has an output port through which the pressurized air is passed on when the valve element is its open position with its sealing tip portion 6 lifted off the valve seat at the inner end of the input port. The mounting plate 30, which has in this embodiment the form of a printed circuit board, is fixed on an inner wall of the housing in such a position that the sealing tip 6 is closing the input port when the SMA valve is not activated.

As shown in the Figures the valve element 4 has the form of an elongated member or plunger, and it is suspended with respect to the mounting plate 30 by a parallelogram suspension. This suspension includes a mounting body 8 attached to the mounting plate 30. The suspension further includes two parallel connecting links 10, 10' (see for example FIG. 2) connecting the valve element 4 to the mounting body 8. The connecting links 10, 10' are disposed essentially perpendicular to the mounting plate 30 and thus suspend the valve element 4 at a distance above the mounting body 8 and mounting plate 30. The connections of the connecting links 10, 10' to the mounting body 8 are provided by hinges 12, 12'. Also the connections of the connecting links 10, 10' to the valve element 4 are provided by hinges 14, 14'. In this embodiment the valve element 4 and its suspension elements 8, 10, 10', 12, 12', 14, 14' described before are integrally formed as one piece of plastic material, wherein the hinges 12, 12', 14, 14' are formed as solid state hinges or flexure hinges, each including a zone of weakened material thickness.

Figure 1:
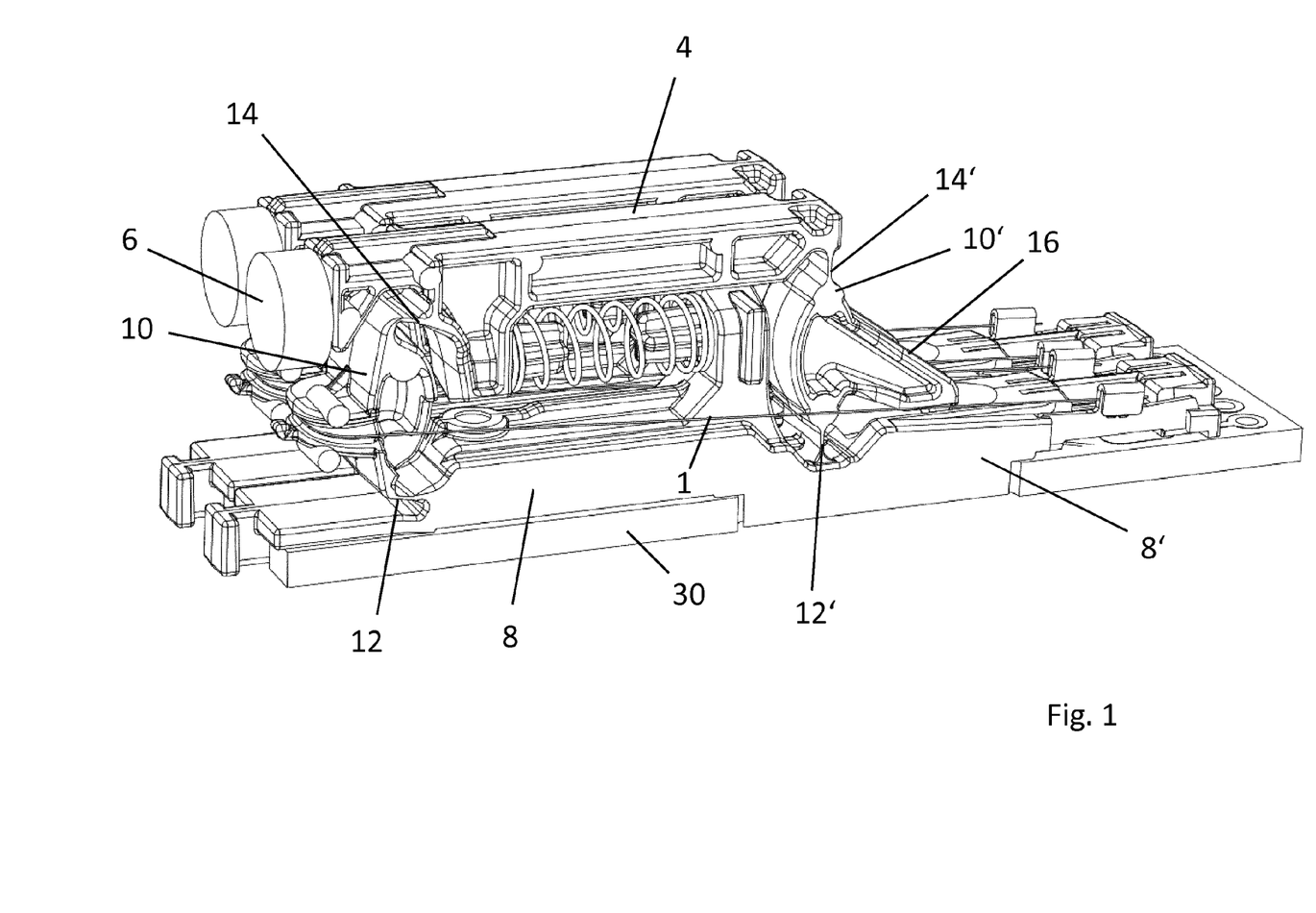
FIG. 1 shows a perspective view of a valve element with its suspension mounted on a mounting plate, wherein a tandem arrangement of two such valve elements parallel to each other is shown.
Figure 2:
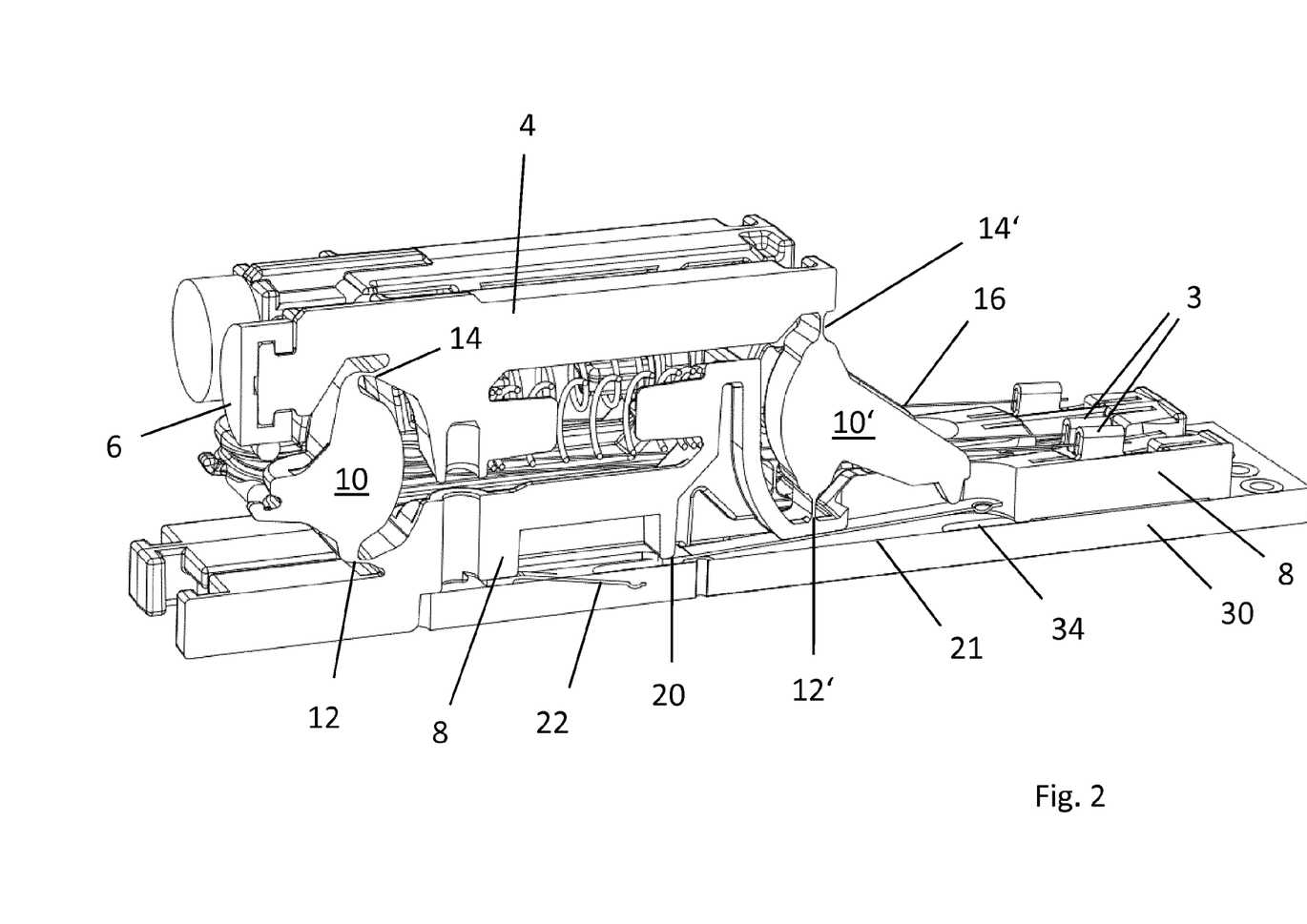
FIG. 2 is a cross-sectional view of the valve element, wherein the cross-section is taken through the middle of the valve element and its suspension so that these elements are cut into halves.
Figure 3:
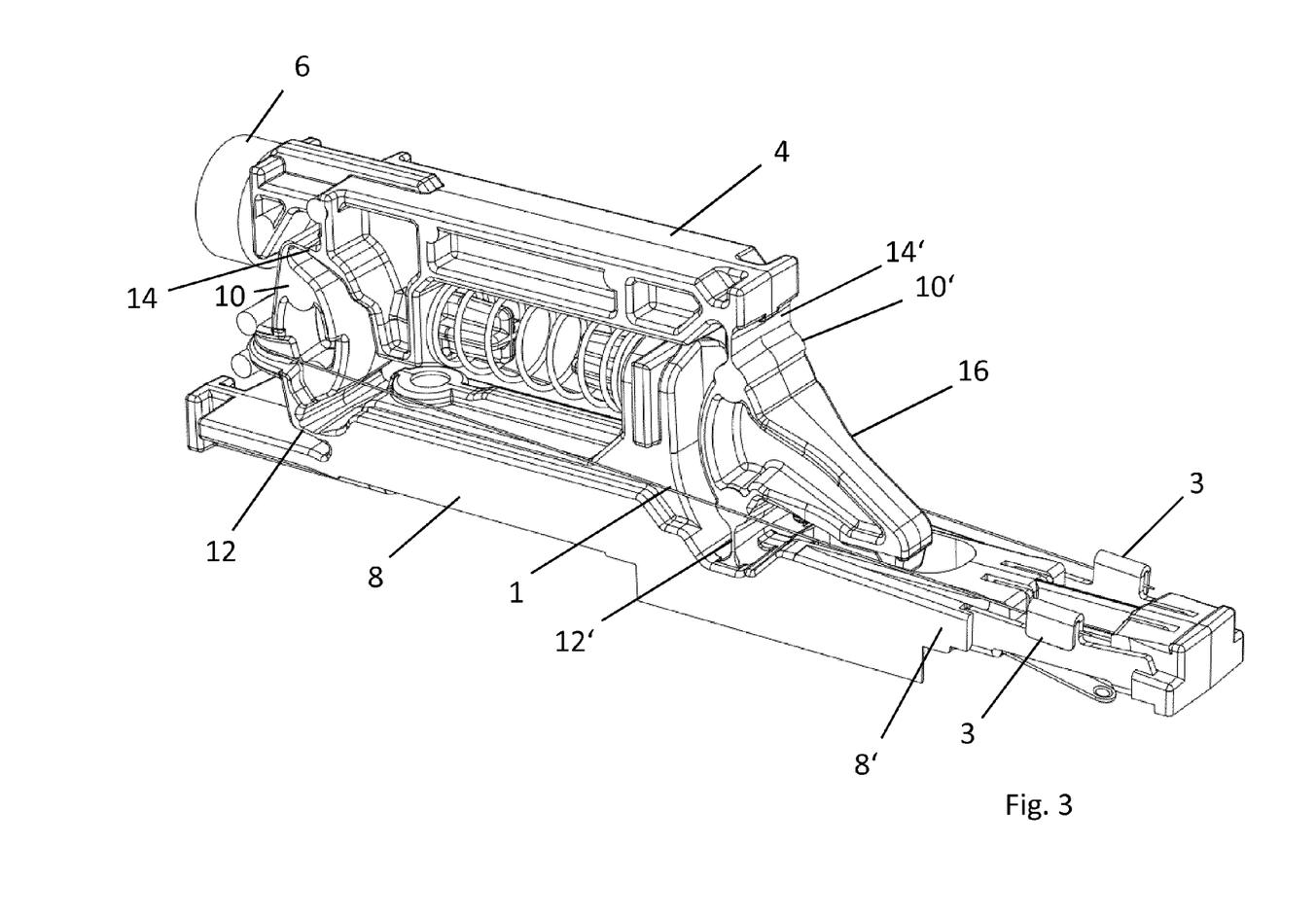
FIG. 3 is a perspective view of a single valve element with its suspension.

In the perspective views of for example FIGS. 1 and 3 the connecting links 10, 10' are shown as having central recesses, whereas in the cross-sectional view of FIG. 2 the through-going inner wall of the connecting links 10, 10' is visible. In other words the central inner wall of the connecting links 10, 10' is on both sides formed with a circumferential wall surrounding the recesses. In this manner the amount of material, and weight of the component is reduced.

The position of the valve element 4 shown in the Figures corresponds to the closed position of the valve element. In this embodiment the connecting links 10, 10' are oriented essentially perpendicular to the longitudinal direction and movement direction of the valve element 4 when the valve element is in its closed position. The length of the connecting links in this embodiment is 9 mm; if the stroke of the valve element 4 from its closed to its opened position is 1 mm in its longitudinal direction, the connecting links 10, 10' pivot by about 6°. This pivotal movement in an angular range of about 6° with respect to the perpendicular orientation of the connecting links 10, 10' is sufficiently small so that the movement of the valve element 4 may to a good approximation be described as a linear movement which is parallel to the mounting plate.

The arrangement of the SMA wire 1 will now be described in connection with FIGS. 1 and 3. The first end of the SMA wire 1 is fixed to a rearward extension 8' extending from the mounting body 8 extending behind the arrangement of the valve element 4 and its suspension 8, 10, 10', 12, 12', 14, 14', at a position spaced apart at a distance behind this arrangement in the direction of movement of the valve element 4 from its open to the closed position. The SMA wire 1 is fixed here with a crimp element 3 to a conductor structure on the rearward extension of the mounting body 8. From this first fixation point the SMA wire 8 extends in a rectilinear fashion towards the arrangement of valve element 4 and its suspension and then along one side past this arrangement to its front end, where the SMA wire 1 is guided in a groove formed in a front face portion of the first connecting link 10 around the front end portion to the other side of the arrangement where it is extending back in symmetrical manner along the opposite side of the arrangement and further to a second fixation point on the rearward extension 8'. At the second fixation point the opposite end of the SMA wire 1 is again crimped to a conductor structure on the rearward extension 8'.

As can be seen in FIGS. 1 and 3 the SMA wire engages the groove in the front face portion of the first connecting link at a vertical level that is close to the region of the first hinge 12. In this manner a high transmission ratio between the shorting distance of the SMA wire 1 and the resulting movement of the valve element 4 is achieved. Such transmission ratio translating a shortening distance of the SMA wire 1 into a movement of the valve element 4 is needed since the force provided by the SMA wire upon shortening is large enough to allow a relatively high transmission ratio, whereas the absolute shortening distance of the SMA wire would be too small to provide the required stroke at the valve element from the closed to the open position. Therefore, the SMA wire cooperates with the first connecting link 10 to provide a transmission ratio between the SMA wire shortening distance and the moving distance of the valve element hinge 14 at the upper end of the connecting link 10, wherein almost the entire length of the connecting link acts as a lever.

As can be seen in FIG. 2 a spring is arranged in the suspension, wherein one end of the spring (in FIG. 2 the end on the right hand side) is held by a protrusion received in the interior end region of the spring, which protrusion is connected to the mounting body 8. The opposite end of the spring is held on an opposite protrusion which is connected to valve element 4. In this manner the compression spring urges the valve element 4 to its closed position.

To actuate the valve element 4 voltage is supplied to the SMA wire 1. For this purpose the crimping elements 3 hold the SMA wire 1 in electrical contact with conductor elements with contacts to the printed circuit board 30 which are supplied with voltage. In a first phase the power supply is relatively high in order to rapidly heat up the SMA wire 1 to reach its transition temperature. Upon reaching the transition temperature, the SMA wire 1 shortens and thereby exerts a pulling force on the first connecting link 10. This pulling force generates a torque pivoting the first connecting link 10 backwards such that the valve element 4 is moved backwards by about 1 mm which is sufficient to lift off the sealing tip 6 from the valve seat and to bring the valve element to the open position.

Once the transition has been effected and the valve element 4 has been moved to the open position the control unit is arranged to reduce the electrical power supply in order to avoid overheating of the SMA wire 1. The fact that the valve element 4 reached the open position is determined by the control unit by an end switch where the conductor of the end switch is moved into contact with a contact area on the printed circuit board to close a circuit which is detected by the control unit. The way the conductor of the end switch is operated by moving the valve element to the open position will be described in the following.

Figure 4:
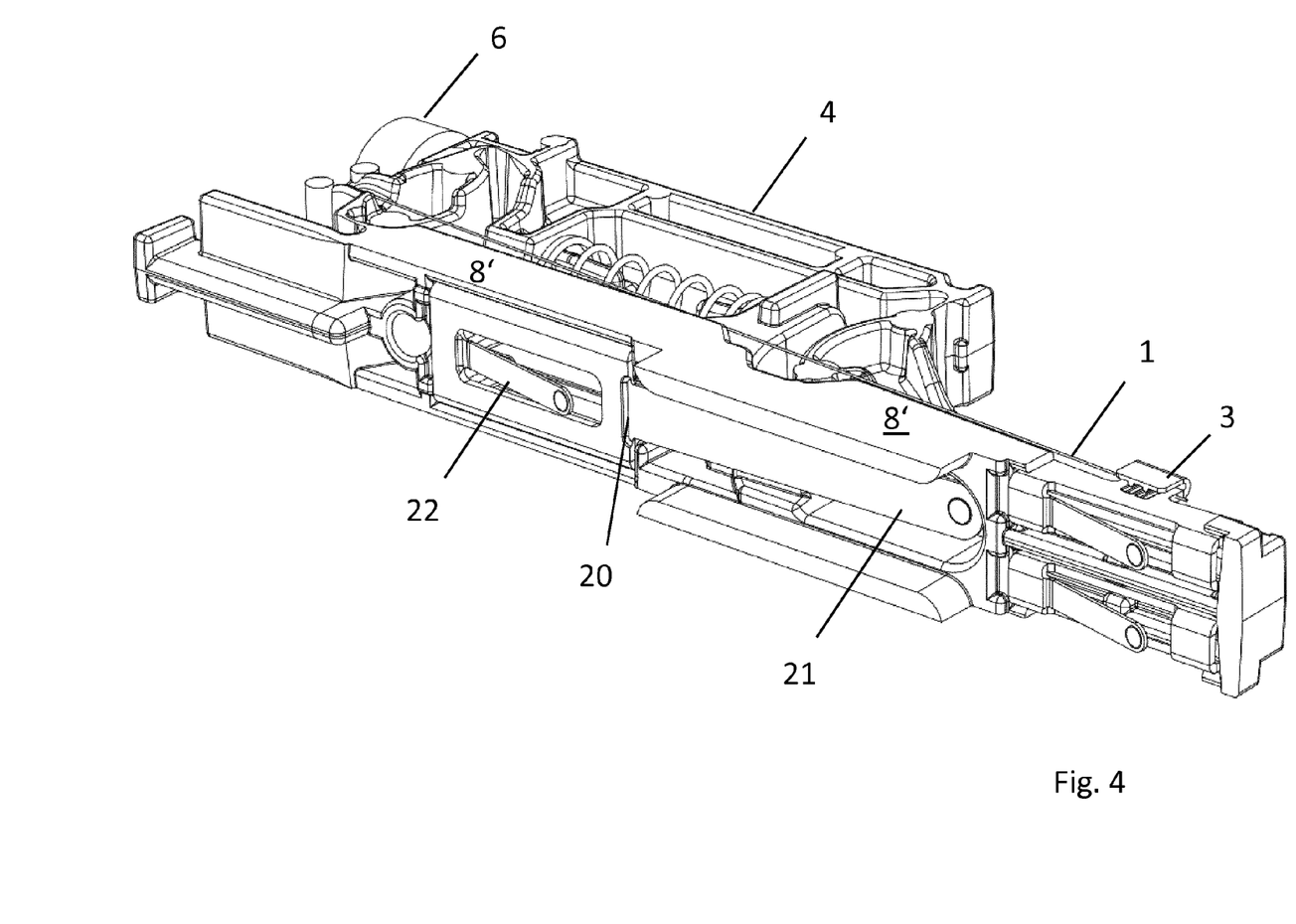
FIG. 4 is a perspective view of the valve element of FIG. 3 from below.
Figure 5:
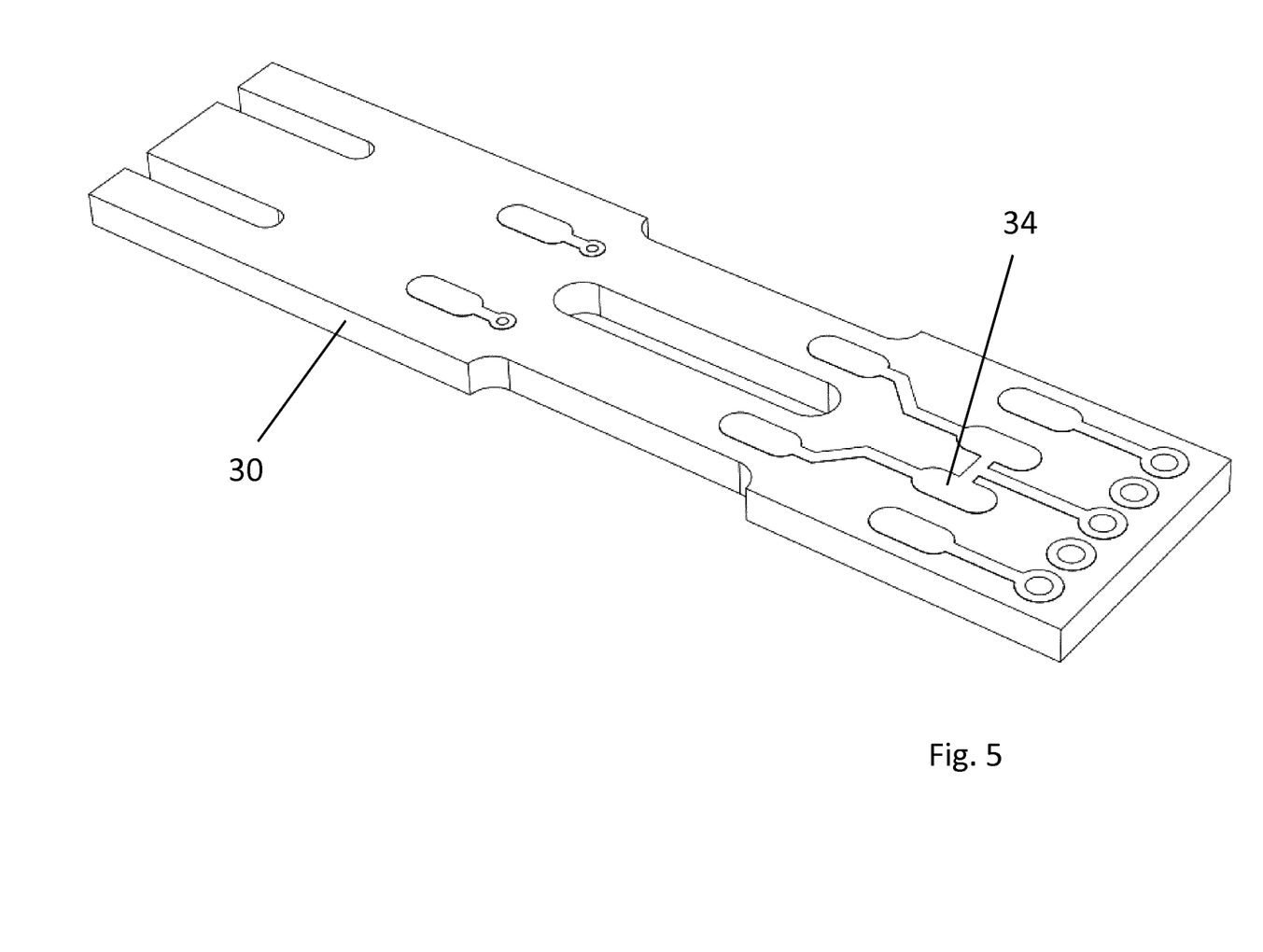
FIG. 5 is a perspective view of a mounting plate of the preferred embodiment.

As can be seen in FIG. 4 the conductor 20 has a first end portion which is provided with a frame with the central opening in which a first cantilever 22 arm is protruding which is elastic and slightly bent downwardly such that its free end comes into contact with a contact point on the printed circuit board 30 when the mounting body 8 is mounted on the printed circuit board. From this end portion of the conductor 20 an elastic cantilever arm 21 is extending in a slot formed in the mounting body 8. The elastic cantilever arm 21 is slightly bent upwardly so that its free end portion is disposed at a certain distance above the printed circuit board 30 when the mounting body 8 is mounted on the printed circuit board 30. In this manner the free end of the elastic cantilever arm 21 of the conductor 20 is positioned above a contact area 34 of the printed circuit board 30 (see FIG. 5).

In order to achieve that the movements of the suspension elements drive the elastic cantilever arm 21 of the conductor 20 to be moved into contact with the contact area 34 of the printed circuit board 30, an actuation arm 16 is formed on the second connecting link 10' (see FIG. 2). This actuation arm 16 extends rearwardly and downwardly behind the valve element and suspension arrangement such that its end portion is at a close distance above the free end portion of the elastic cantilever arm 21 when the valve element 4 is in its closed position. When the valve element 4 is moved backward by the transition of the SMA wire 1 to a shortened state the second connecting link 10' is pivoting backward in the same manner as the first connecting link 10 since the second connecting link 10' has to follow the movement of the valve element 4. By pivoting the second connecting link 10' backward the actuation arm 16 is pivoted downwardly such that its downward end portion is moved to contact the free end portion of the elastic cantilever arm 21 and to press it down onto the contact area 34. In this manner an electrical circuit which further comprises the opposite smaller elastic cantilever arm 22 in contact with a further contact point on the printed circuit board is closed which is detected by the control unit. When the movement the valve element 4 to its open position has been detected based on the circuit closed by the elastic cantilever arm 21, the control unit reduces the power supply to the SMA wire 1 in order to avoid overheating.

The invention claimed is:

1. An SMA valve for controlling pressurized air supply to an air cell in a vehicle seat comprising:
    a valve housing,
    a valve element moveably suspended with respect to a mounting plate in the housing and moveable between a closed position in which the valve element is in sealing abutment with a valve seat establishing a closed state of the valve, and an open position in which the valve element is moved away from the valve seat corresponding to an open state of the valve,
    a spring element adapted to exert a bias force on the valve element urging the valve element to the closed position,
    an SMA wire extending between a point fixed in the housing and the valve element, and arranged such that shortening of the SMA wire upon exceeding a threshold temperature exerts a force on the valve element which pulls the valve element away from the closed position to the open position against the bias force of the spring element,
    a conductor arranged with respect to the mounting plate such that the conductor is moved into contact with contact area on the mounting plate to close an electrical circuit as a result of the valve element reaching the open position, and the conductor is moved away from the contact area when the valve element leaves the open position,
    a control unit arranged to supply electrical power to the SMA wire for opening the valve and to detect closure of the electrical circuit, and arranged to reduce the electrical power supply to the SMA wire when detecting closure of the electrical circuit,
    wherein a suspension of the valve element is arranged such that the valve element moves relative to the mounting plate between the closed and open positions, and wherein an actuator arm is fixed to and extends from the suspension and is arranged such that, upon movement of the valve element from the closed to the open position, the actuator arm moves towards the mounting plate to bring at least a portion of the conductor into contact with the contact area on the mounting plate.

2. The SMA valve according to claim 1, wherein the conductor comprises a portion in contact with the mounting plate and an elastic cantilever arm protruding with a free end of the cantilever arm to a position above the contact area on the mounting plate, and the actuator arm is arranged such that the actuator arm is, upon moving as a result of the movement of the valve element from the closed to the open position, moved by the suspension to contact the elastic cantilever arm and to press the free end of the elastic cantilever arm into contact with the contact area on the mounting plate.

3. The SMA valve according to claim 2, wherein the suspension is further defined as a parallelogram suspension which comprises a mounting body connected to the mounting plate, two parallel connecting links extending between the mounting body and the valve element at a distance from each other in moving direction of the valve element, the first connecting link being connected to the mounting body by a first hinge and to the valve element by a first valve element hinge, the second connecting link being connected to the mounting body by a second hinge and to the valve element by a second valve element hinge, wherein the connecting links are arranged such that the connecting links pivot over an angular range with respect to a longitudinal direction of the valve element and the moving direction of the valve element when the valve element moves between the closed and open positions, the angular range including a 90° angle between the connecting links and the longitudinal and moving directions.

4. The SMA valve according to claim 3, wherein the mounting body, the first connecting link, the second connecting link, the valve element, and the hinges are integrally formed of plastic material and the first and second hinges and the first and second valve element hinges are solid state hinges with each hinge having a zone of weakened material thickness.

5. The SMA valve according to claim 4, wherein the SMA wire extends from a first fixation means stationary with respect to the mounting body and located behind an arrangement of the valve element and the suspension in the direction of movement of the valve element from the closed to the open position, towards the arrangement, past the arrangement along a first side thereof, around a front face portion of the first connecting link, in a symmetrical manner back along an opposite side of the arrangement, and further to a second fixation means behind the arrangement.

6. The SMA valve according to claim 4, wherein the actuation arm protrudes from the second connecting link in a direction away from the valve element and downwardly towards a rearward extension extending from the mounting body such that the actuation arm is pivoted with the second connecting link upon movement of the valve element from the closed position to the open position and pivoted further downwardly such that the outer end of the actuation arm comes into contact with the elastic cantilever arm of the conductor to press the conductor down into contact with the contact area on the mounting plate.

7. The SMA valve according to claim 3, wherein the SMA wire extends from a first fixation means stationary with respect to the mounting body and located behind an arrangement of the valve element and the suspension in the direction of movement of the valve element from the closed to the open position, towards the arrangement, past the arrangement along a first side thereof, around a front face portion of the first connecting link, in a symmetrical manner back along an opposite side of the arrangement, and further to a second fixation means behind the arrangement.

8. The SMA valve according to claim 7, wherein the fixation means of the SMA wire is located on a rearward extension extending the mounting body in the direction of movement of the valve element from the closed to the open position.

9. The SMA valve according to claim 8, wherein the front face portion of the first connecting link around which the SMA wire is routed is located at a lower end portion of the first connecting link close to the first hinge.

10. The SMA valve according to claim 8, wherein the SMA wire extends rectilinearly towards and along the arrangement in a direction essentially parallel to the movement direction of the valve element from the closed to the open position.

11. The SMA valve according to claim 7, wherein the front face portion of the first connecting link around which the SMA wire is routed is located at a lower end portion of the first connecting link close to the first hinge.

12. The SMA valve according to claim 11, wherein the SMA wire extends rectilinearly towards and along the arrangement in a direction essentially parallel to the movement direction of the valve element from the closed to the open position.

13. The SMA valve according to claim 7, wherein the SMA wire extends rectilinearly towards and along the arrangement in a direction essentially parallel to the movement direction of the valve element from the closed to the open position.

14. The SMA valve according to claim 3, wherein the actuation arm protrudes from the second connecting link in a direction away from the valve element and towards a rearward extension extending from the mounting body such that the actuation arm is moved with the second connecting link upon movement of the valve element from the closed position to the open position and moved further such that the outer end of the actuation arm comes into contact with the elastic cantilever arm of the conductor to press the conductor into contact with the contact area on the mounting plate.

15. The SMA valve according to claim 14, wherein the actuation arm is integrally formed with the second connecting link.

16. The SMA valve according to claim 1, wherein the suspension is further defined as a parallelogram suspension which comprises a mounting body connected to the mounting plate, two parallel connecting links extending between the mounting body and the valve element at a distance from each other in moving direction of the valve element, the first connecting link being connected to the mounting body by a first hinge and to the valve element by a first valve element hinge, the second connecting link being connected to the mounting body by a second hinge and to the valve element by a second valve element hinge, wherein the connecting links are arranged such that the connecting links pivot over an angular range with respect to a longitudinal direction of the valve element and the moving direction of the valve element when the valve element moves between the closed and open positions, the angular range including a 90° angle between the connecting links and the longitudinal and moving directions.

* * * * *

UNITED STATES PATENT AND TRADEMARK OFFICE
CERTIFICATE OF CORRECTION

PATENT NO. : 9,970,564 B2  
APPLICATION NO. : 15/314252  
DATED : May 15, 2018  
INVENTOR(S) : Frank Dankbaar et al.

Page 1 of 1

It is certified that error appears in the above-identified patent and that said Letters Patent is hereby corrected as shown below:

In the Claims

Column 9, Line 26-27 (Claim 1): delete "with contact area" and insert therefor --with a contact area--.

Signed and Sealed this
Eleventh Day of December, 2018

Andrei Iancu
*Director of the United States Patent and Trademark Office*